United States Patent
Ha et al.

(10) Patent No.: US 9,798,026 B2
(45) Date of Patent: Oct. 24, 2017

(54) ELASTIC REVERSE-TIME MIGRATION SYSTEM AND METHOD USING ABSOLUTE VALUE FUNCTION FOR IMPROVING THE QUALITY OF SUBSURFACE STRUCTURE IMAGING

(71) Applicant: KOREA INSTITUTE OF GEOSCIENCE AND MINERAL RESOURCES, Daejeon (KR)

(72) Inventors: Jiho Ha, Busan (KR); Wookeen Chung, Busan (KR); Sungryul Shin, Busan (KR); Young-Jun Kim, Daejeon (KR); Wonsik Kim, Daejeon (KR)

(73) Assignee: KOREA INSTITUTE OF GEOSCIENCE AND MINERAL RESOURCES, Daejeon (KR)

( * ) Notice: Subject to any disclaimer, the term of this patent is extended or adjusted under 35 U.S.C. 154(b) by 2 days.

(21) Appl. No.: 15/196,841

(22) Filed: Jun. 29, 2016

(65) Prior Publication Data
US 2017/0003410 A1    Jan. 5, 2017

(30) Foreign Application Priority Data
Jul. 2, 2015 (KR) .......... 10-2015-0094460

(51) Int. Cl.
*G01V 1/28* (2006.01)
*G01V 1/36* (2006.01)

(52) U.S. Cl.
CPC ........ *G01V 1/282* (2013.01); *G01V 2210/125* (2013.01); *G01V 2210/51* (2013.01); *G01V 2210/67* (2013.01); *G01V 2210/679* (2013.01)

(58) Field of Classification Search
CPC ............... G01V 1/282; G01V 2210/51; G01V 2210/67; G01V 2210/679; G01V 2210/125
USPC .......................................................... 367/50
See application file for complete search history.

(56) References Cited

U.S. PATENT DOCUMENTS 8,953,411 B2 * 2/2015 Shin ...................... G01V 1/28
367/59

FOREIGN PATENT DOCUMENTS

KR        10-1413751        7/2014

OTHER PUBLICATIONS

Ha, Jiho, et al., "Efficient elastic reverse-time migration for the decomposed P-wavefield using stress tensor in the time domain," Journal of Applied Geophysics 116, Mar. 2015.

* cited by examiner

*Primary Examiner* — Daniel L Murphy
(74) *Attorney, Agent, or Firm* — Hauptman Ham, LLP

(57) ABSTRACT

Provided is elastic reverse-time migration system and method using an absolute value function for improving the quality of subsurface structure images, and more particularly, elastic reverse-time migration system and method using an absolute value function for improving the quality of subsurface structure images capable of minimizing waveform changing by separating wavefields using stress-displacement relationships and improving accuracy of the subsurface structure images by applying the absolute value function to migration images.

4 Claims, 17 Drawing Sheets

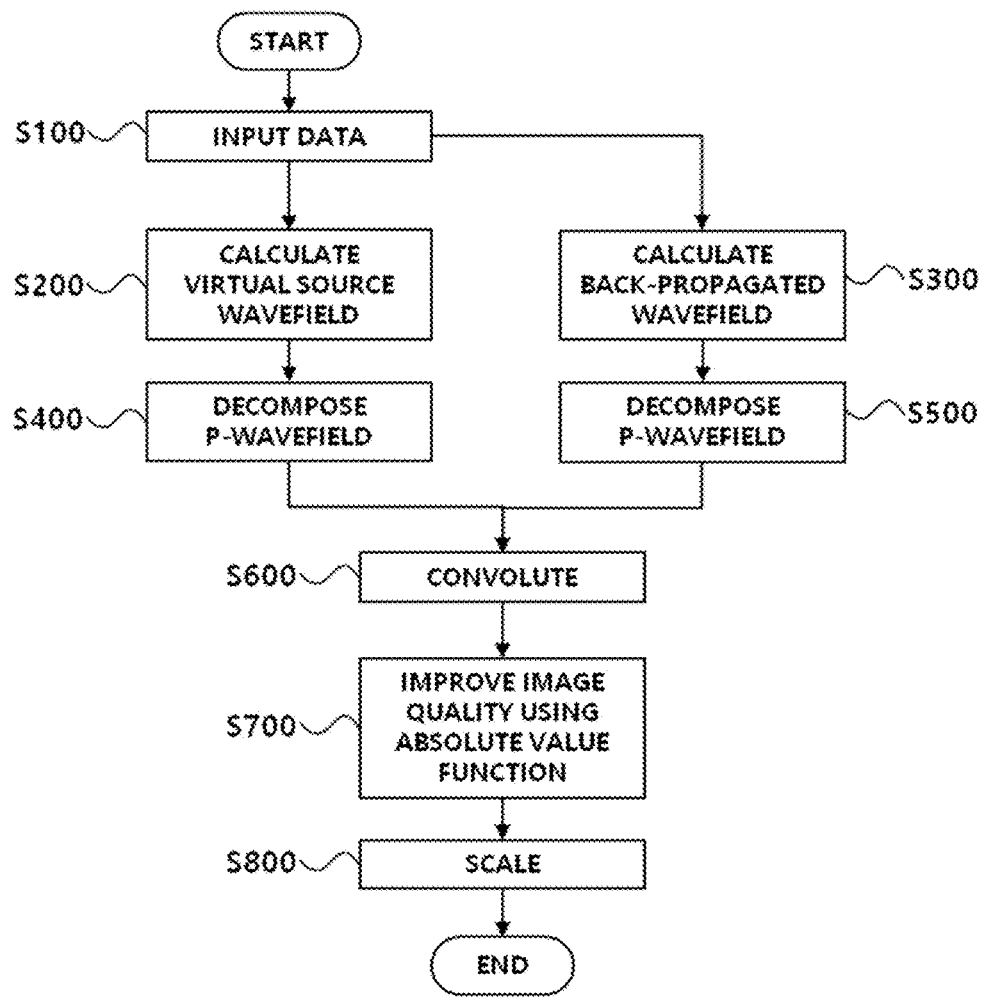

ELASTIC REVERSE-TIME MIGRATION SYSTEM AND METHOD USING ABSOLUTE VALUE FUNCTION FOR IMPROVING THE QUALITY OF SUBSURFACE STRUCTURE IMAGING

CROSS-REFERENCE TO RELATED APPLICATIONS

This application claims priority under 35 U.S.C. §119 to Korean Patent Application No. 10-2015-0094460, filed on Jul. 2, 2015, in the Korean Intellectual Property Office, the disclosure of which is incorporated herein by reference in its entirety.

TECHNICAL FIELD

The following disclosure relates to elastic reverse-time migration system and method using an absolute value function for improving the quality of subsurface structure images, and more particularly, to elastic reverse-time migration system and method using an absolute value function for improving the quality of subsurface structure images capable of minimizing waveform changing by separating wavefields using a relationship between a displacement and a stress and improving accuracy of the subsurface structure images by applying the absolute value function to migration images.

BACKGROUND

Seismic survey is a method for understanding a subsurface structure by artificially generating an elastic wave on an earth's surface or under water and analyzing a propagation behavior of the generated elastic wave. However, when a stratum has an inclination or a complicated geological structure, the elastic wave may be distorted or diffracted at a reflection site. Therefore, for the accurate subsurface imaging using seismic data, the migration that is a process of relocating a distorted reflection event to an accurate reflection position is required.

For the migration, Kirchhoff migration based on ray tracing and reverse-time migration using wave equations have been mainly used. In particular, the reverse-time migration using two-way wave equations may obtain high-accuracy images even in complicated geological features, but since the reverse-time migration using two-way wave equations requires much computation and relatively long operation time, the reverse-time migration has been mainly performed under the assumption that subsurface media is acoustic media having a few variables to be considered.

However, as apparatuses having computability like a supercomputer comes into wide use in recent years, the reverse-time migration in elastic media by which the subsurface structure may be reflected to be closer to reality has been performed. Unlike the acoustic media, a P-wave, an S-wave, a PS-converted wave, and so on are propagated through the elastic media. Here, each wave acts as noise for the other, and therefore anomalies different from the real subsurface structure may occur, such that the subsurface structure may not be accurately imaged.

Therefore, the reverse-time migration needs a process of separating each wavefield from the mixed wavefields. In connection with this, many studies on decomposing of the P-wavefield that may be propagated up to a deep depth have been conducted. For this purpose, the divergence operator has been applied to P-wavefield decomposition.

Thereafter, studies are being focused on anisotropy and three-dimensional data processing. However, the method for separating wavefields using a divergence operator requires a spatial differentiation for a stress component, such that waveform changing of the wavefield may be induced. Further, studies for clearly interpreting a subsurface stratum structure are necessarily required. In particular, notwithstanding that a subsurface structure of a high-velocity layer like salt dome that is a representative form of a reservoir in which petroleum and gas resources reserve is an important factor dominating a distribution form and a size of the reservoir, the general reverse-time migration method has a limitation of representing the subsurface structure. Therefore, a method that can overcome the problems is required.

RELATED ART DOCUMENT

Patent Document (Patent Document 1) Korean Patent No. 10-1413751 (Registration date: Jun. 24, 2014)

SUMMARY

An object of the present invention is directed to providing elastic reverse-time migration system and method capable of minimizing a change in waveform of a wavefield in performing a separation of the wavefield when the migration is performed.

Another object of the present invention is directed to providing elastic reverse-time migration system and method capable of minimizing a change in waveform of a wavefield in performing a separation of the wavefield when the migration is performed.

In one general aspect, an elastic reverse-time migration system includes: a virtual source calculation unit loading seismic data and a subsurface structure model to calculate a virtual source; a virtual source wavefield calculation unit calculating a virtual source wavefield from the calculated virtual source; a back-propagated wavefield calculation unit loading the seismic data to perform back propagation processing and calculate a back-propagated wavefield; a virtual source wavefield waveform separation unit using stress-displacement relationships to decompose a P-wavefield from the virtual source wavefield; a back-propagated wavefield waveform separation unit using the stress-displacement relationships to decompose a P-wavefield from the back-propagated wavefield; and a convolution unit convoluting the two wavefields decomposed from the virtual source wavefield waveform separation unit and the back-propagated wavefield waveform separation unit.

The elastic reverse-time migration system may further include: an image quality improvement unit applying an absolute value function to the migration images obtained by the convolution of the convolution unit.

In another general aspect, an elastic reverse-time migration method includes: a) loading seismic data and subsurface structure model data; b) calculating a virtual source on the basis of the input data and calculating a virtual source wavefield; c) performing back propagation processing on the seismic data to calculate a back-propagated P-wavefield; d) decomposing a P-wavefield from a virtual source wavefield using the stress-displacement relationships; e) decomposing a wavefield from the back-propagated wavefield using the stress-displacement relationships; and f) convoluting the two wavefields decomposed in the step c) and the step e), respectively.

The elastic reverse-time migration method may further include: g) applying an absolute value function to the migration images obtained by the convolution in the step f).

Other features and aspects will be apparent from the following detailed description, the drawings, and the claims.

BRIEF DESCRIPTION OF THE DRAWINGS

FIG. 2 is a flow chart of a migration method according to an exemplary embodiment of the present invention.

DETAILED DESCRIPTION OF MAIN ELEMENTS

Figure 1:
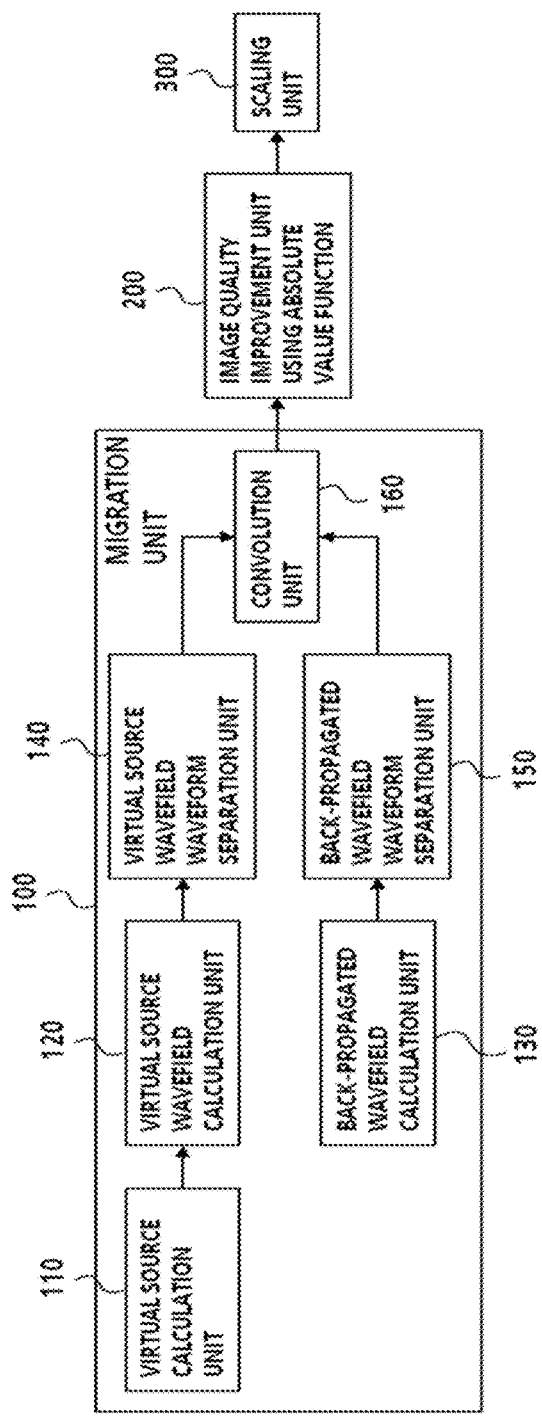
FIG. 1 is a configuration diagram of a migration system according to an exemplary embodiment of the present invention.
Figure 3A:
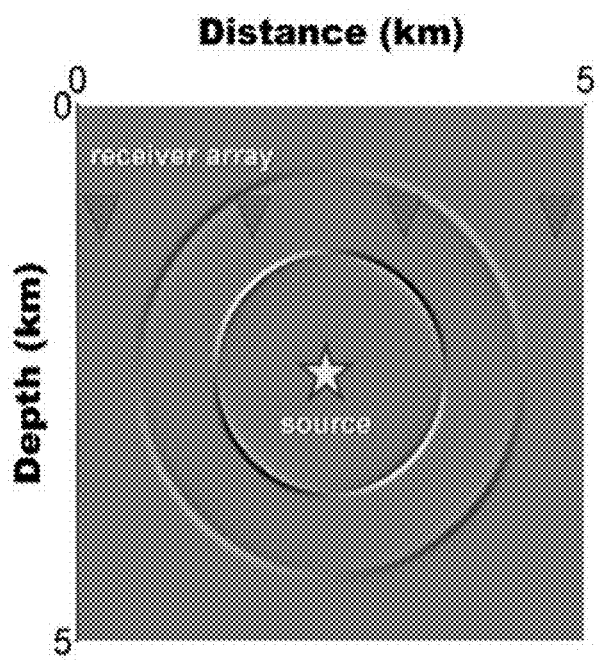
FIG. 3A is a diagram illustrating the displacement wavefield showing the horizontal component in elastic media.
Figure 3B:
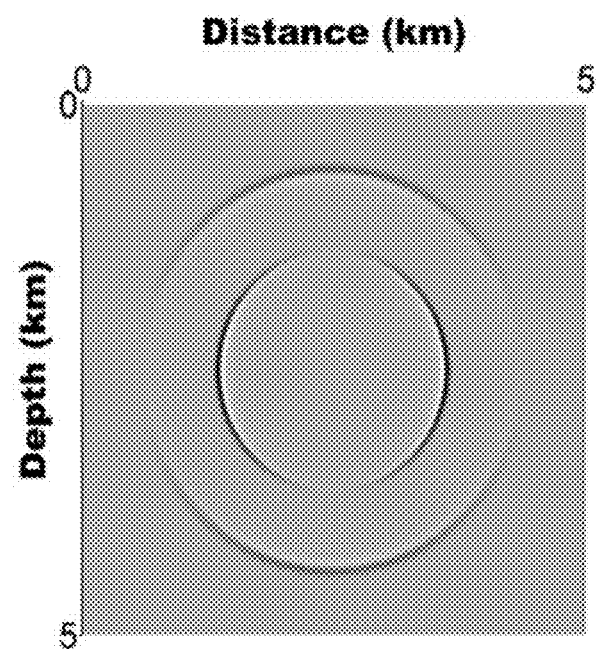
FIG. 3B is a diagram illustrating the displacement wavefield showing the vertical component in the elastic media.
Figure 3C:
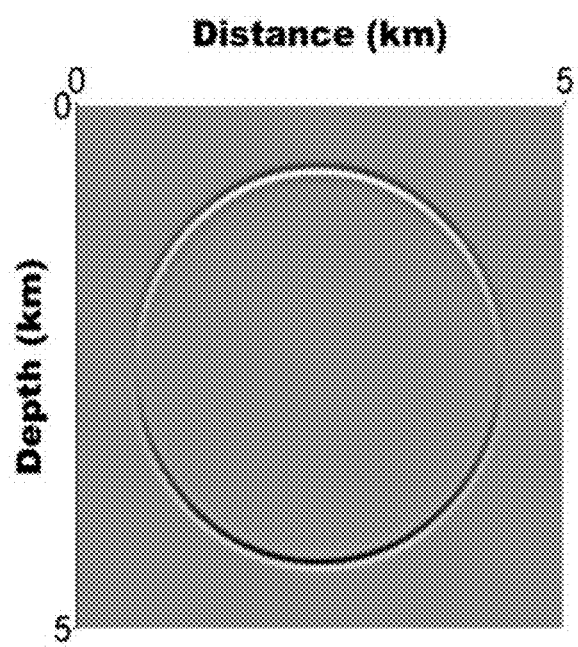
FIG. 3C is a diagram illustrating the displacement wavefield showing the separated wavefield by using divergence operator.
Figure 3D:
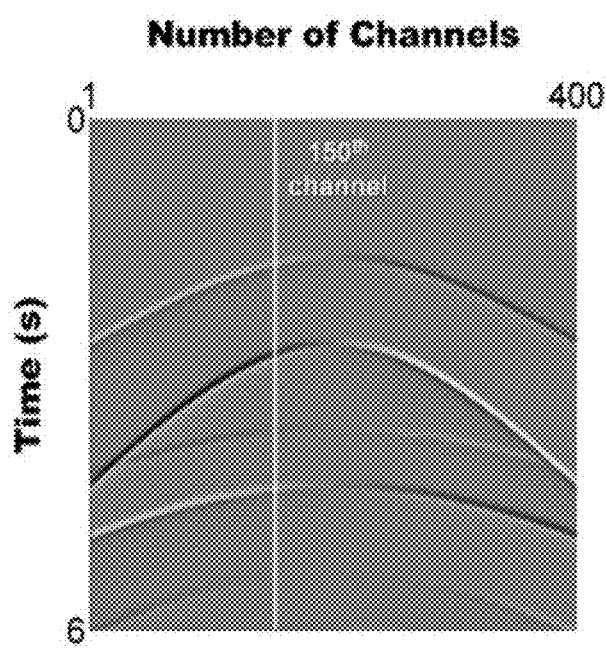
FIGS. 3D to 3F are diagrams illustrating a recorded seismograms of horizontal and vertical components and separated wavefield.
Figure 3E:
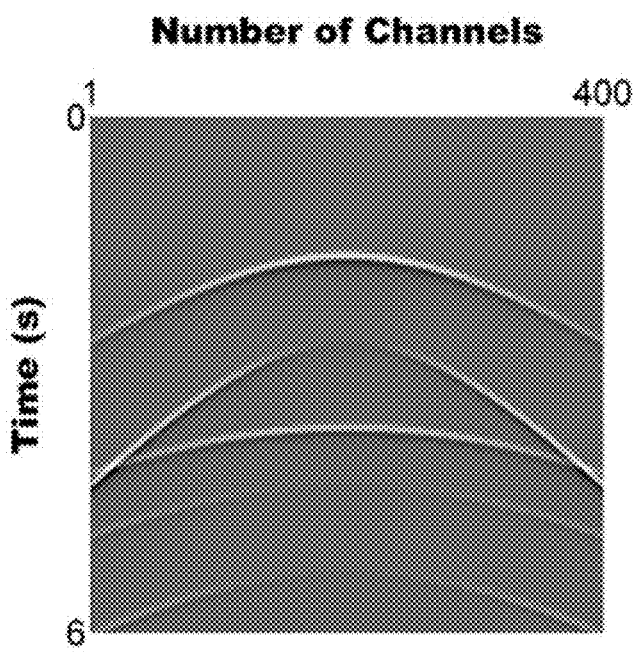
Figure 3F:
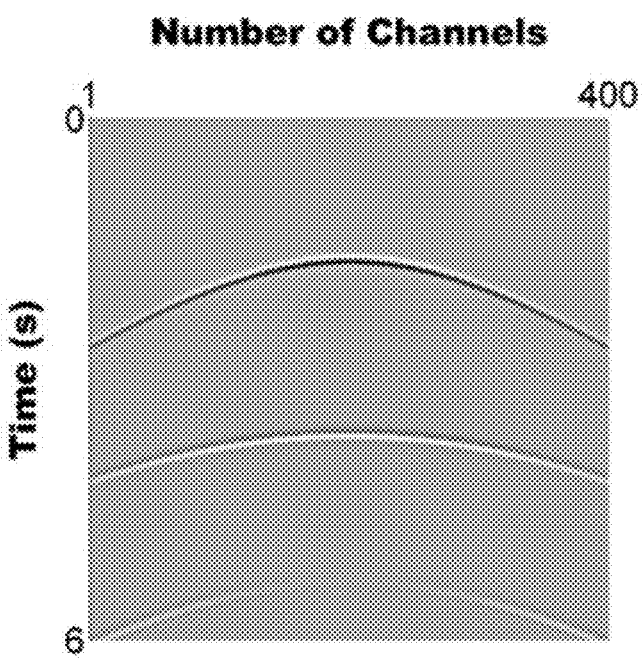
Figure 3G:
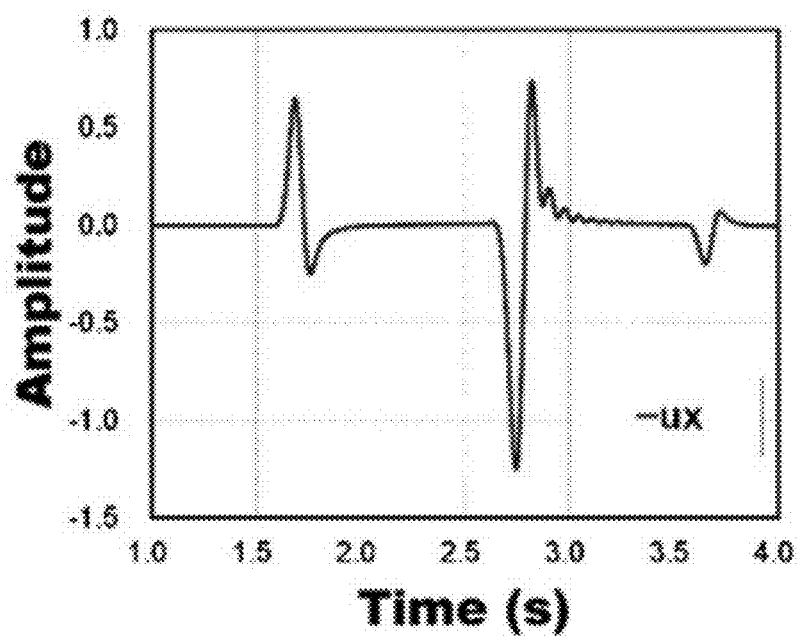
FIGS. 3G to 3I are diagrams illustrating extracted traces at a 150-th channel of recorded seismograms.
Figure 3H:
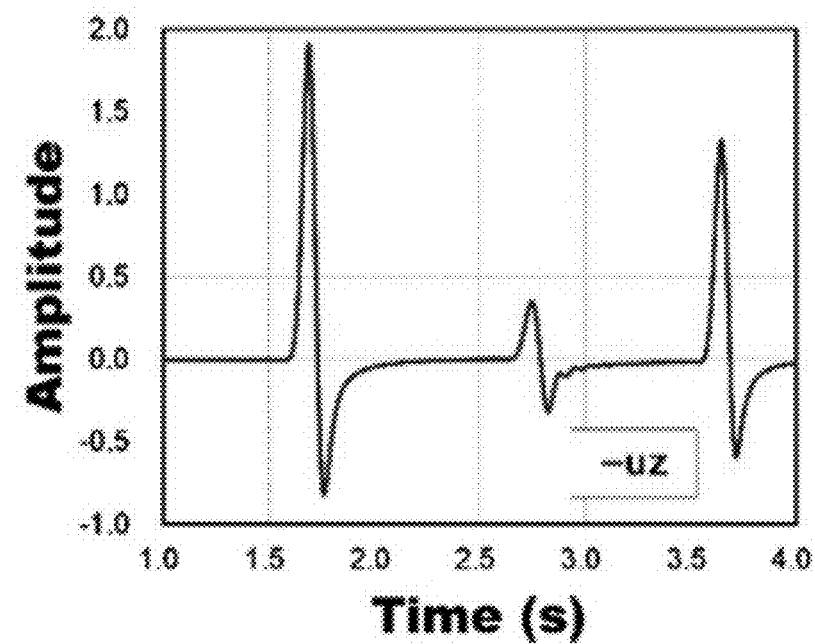
Figure 3I:
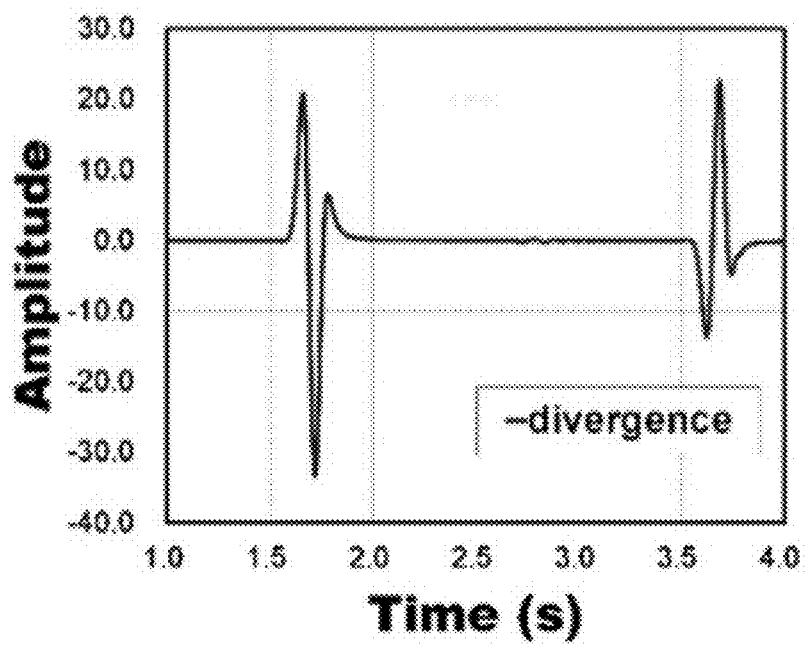
Figure 4A:
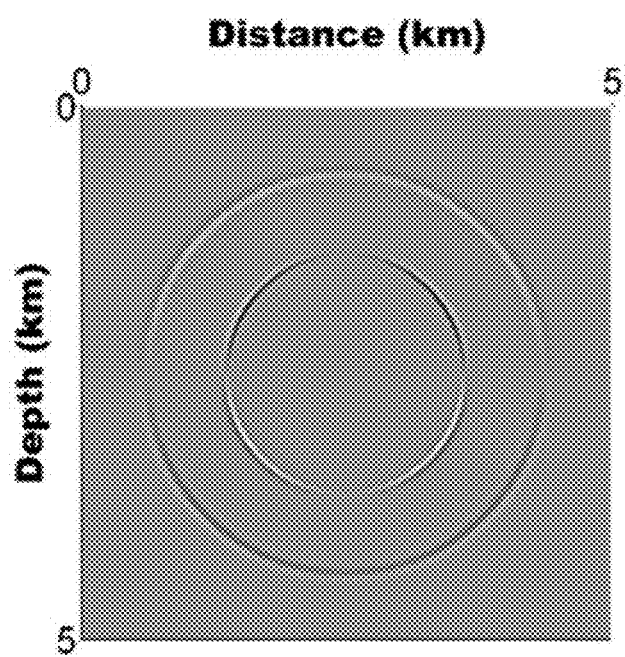
FIG. 4A is a diagram illustrating the wavefield of stress tensor showing the horizontal component in elastic media.
Figure 4B:
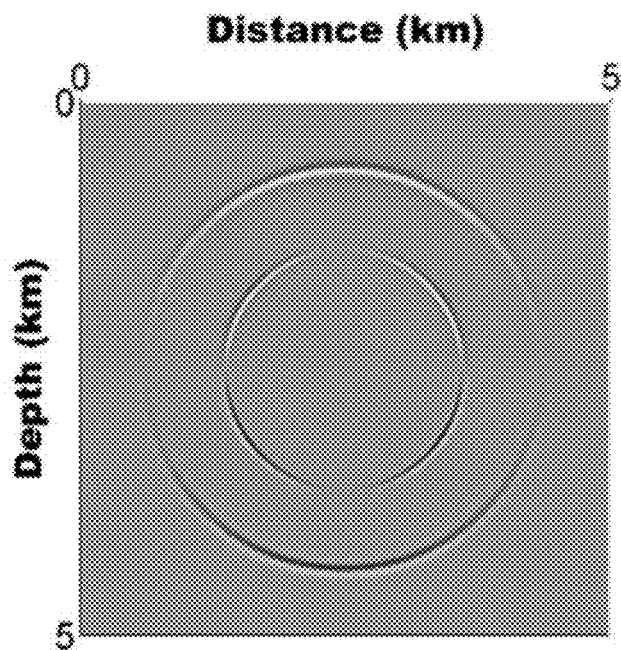
FIG. 4B is a diagram illustrating the wavefield of stress tensor showing the vertical component in the elastic media.
Figure 4C:
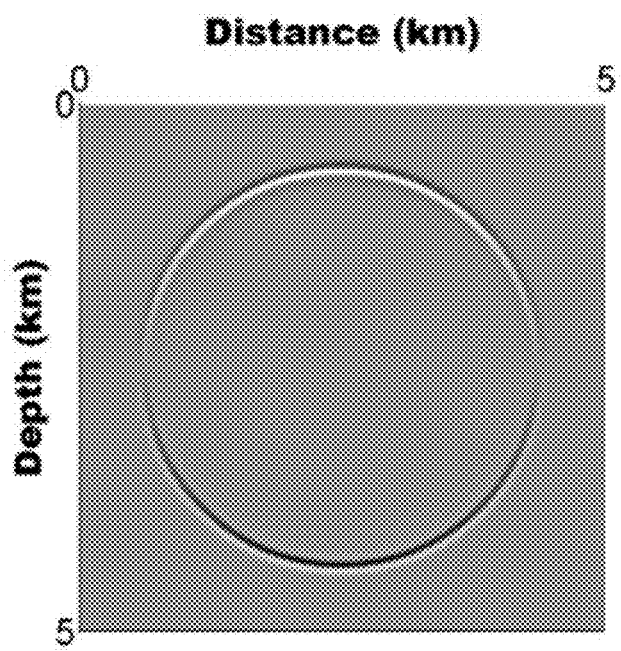
FIG. 4C is a diagram illustrating the wavefield of stress tensor showing separated wavefield by using a relational expression between a displacement and a stress according to an exemplary embodiment of the present invention.
Figure 4D:
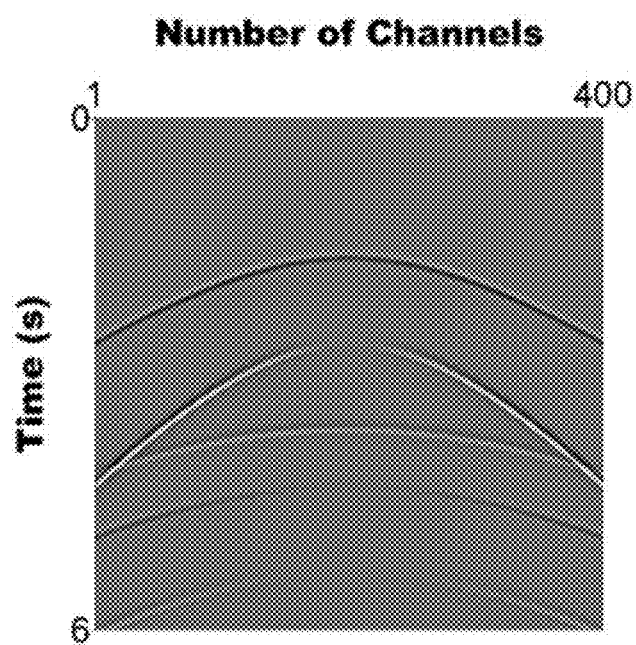
FIGS. 4D to 4F are diagrams illustrating a recorded seismograms of horizontal and vertical components and separated wavefield.
Figure 4E:
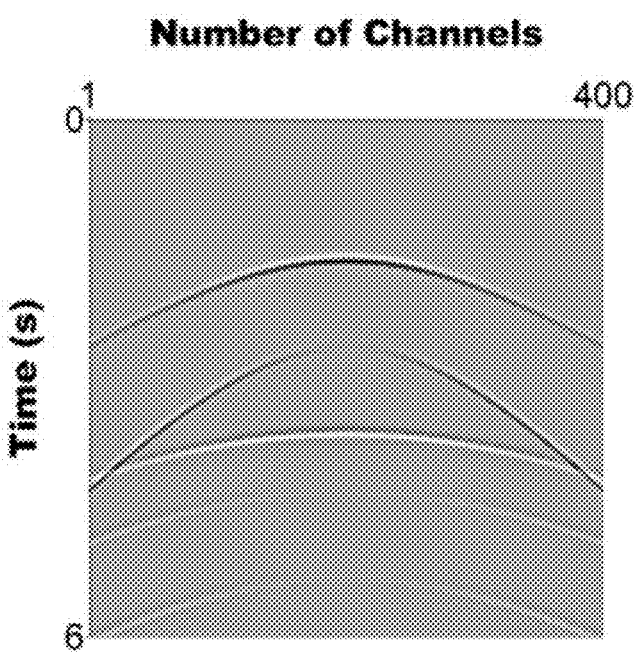
Figure 4F:
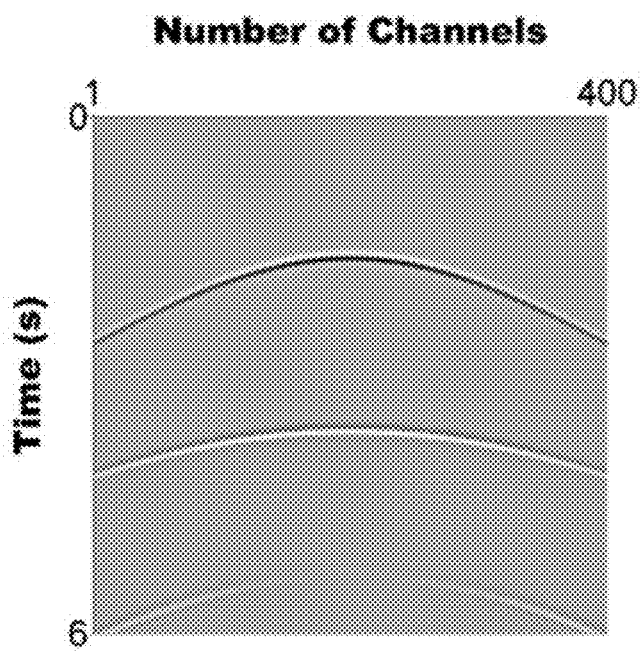
Figure 4G:
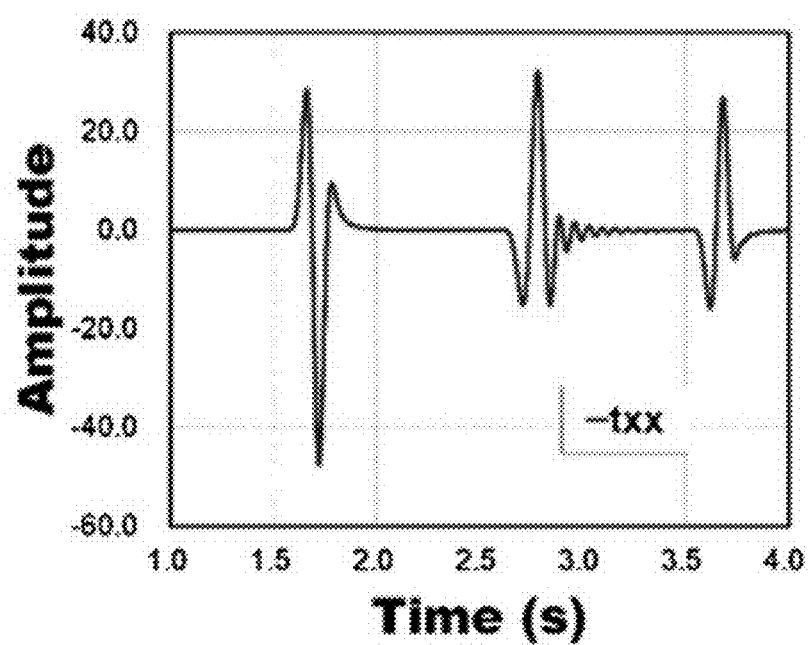
FIGS. 4G to 4I are diagrams illustrating extracted traces at a 150-th channel of recorded seismograms.
Figure 4H:
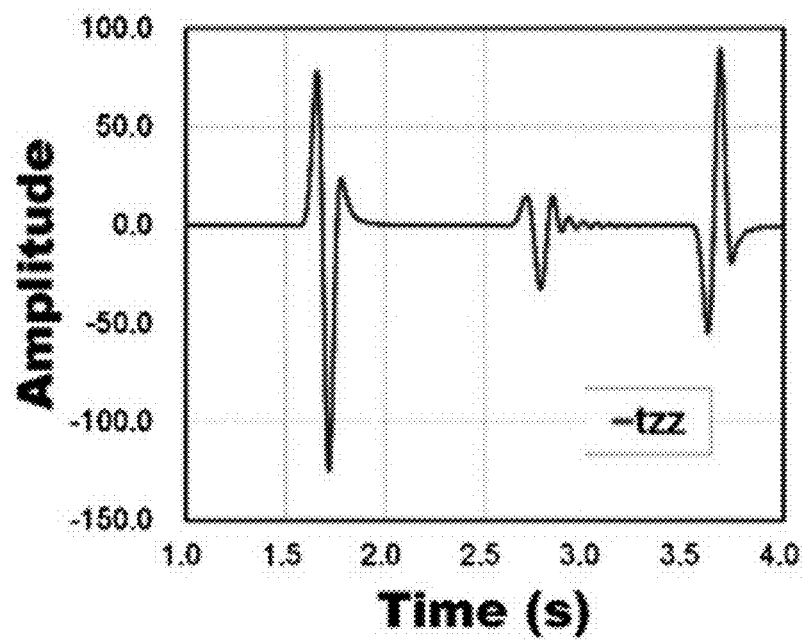
Figure 4I:
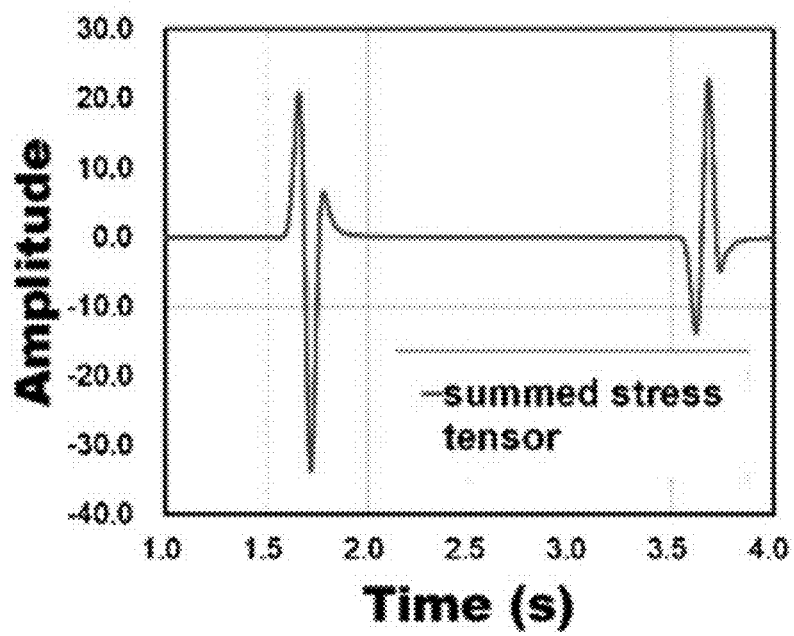

100: Migration unit
110: Virtual source calculation unit
120: Virtual source wavefield calculation unit
130: Back-propagated wavefield calculation unit
140: Virtual source wavefield waveform separation unit
150: Back-propagated wavefield waveform separation unit
160: Convolution unit
200: Image quality improvement unit using absolute value function
300: Scaling unit

DETAILED DESCRIPTION OF EMBODIMENTS

Hereinafter, a technical spirit of the present invention will be described in more detail with reference to the accompanying drawings.

The accompanying drawings are only examples shown in order to describe the technical idea of the present invention in more detail. Therefore, the technical idea of the present invention is not limited to shapes of the accompanying drawings.

FIG. 1 is a configuration diagram of a migration system according to an exemplary embodiment of the present invention and FIG. 2 is a flow chart of a migration method according to an exemplary embodiment of the present invention.

An elastic reverse-time migration system according to an exemplary embodiment of the present invention includes a migration unit, in which the reverse-time migration based on two-way wave equations in elastic media is performed. As illustrated in FIG. 1, the migration unit 100 includes a virtual source calculation unit 110, a virtual source wavefield calculation unit 120, a back-propagated wavefield calculation unit 130, a virtual source wavefield waveform separation unit 140, a back-propagated wavefield waveform separation unit 150, and a convolution unit 160. In this case, the virtual source calculation unit 110, the virtual source wavefield calculation unit 120, and the back-propagated wavefield calculation unit 130 are well known, and therefore the detailed description thereof will be omitted and briefly described.

First, seismic data and a subsurface structure model are loaded to the virtual source calculation unit 110 (S100). The virtual source calculation unit 110 calculates a virtual source on the basis of the input data and the virtual source wavefield calculation unit 120 calculates a virtual source wavefield from the calculated virtual source (S200). Further, the back-propagated wavefield calculation unit 130 receives the seismic data to process the back propagation and calculates the back-propagated wavefield on the basis of the back propagation-processed data (S300).

Thereafter, the virtual source wavefield waveform separation unit 140 decomposes the P-wavefield from the calculated virtual source wavefield (S400) and the back-propagated wavefield waveform separation unit 150 decomposes the P-wavefield from the back-propagated wavefield (S500). In this case, according to the exemplary embodiment of the present invention, the separation of each wavefield is performed using the stress-displacement relationships of each wavefield.

As described above, to obtain accurate subsurface structure images by minimizing an effect of noise in the reverse-time migration, the process of separating wavefields having several components (S400 and S500) is required. As the technique of separating wavefields according to the related art, a method using a divergence operator has been mainly used. The method with application of the divergence operator causes the waveform changing by spatial derivatives on displacement components for calculating the divergence. To solve the above problems, the exemplary embodiment of the present invention performs the waveform separation using the stress-displacement relationships, instead of the divergence operator. That is, the exemplary embodiment of the present invention utilizes the stress tensor by spatially differentiated displacement, and as a result has an advantage in that the waveform changing is induced even after the wavefields are separated. The detailed method thereof will be described below.

Thereafter, the convolution unit 160 convolutes a virtual source P-wavefield and a back-propagated P-wavefield that are decomposed by the virtual source wavefield waveform separation unit 140 and a back-propagated wavefield waveform separation unit 150 (S600), respectively, to acquire the migration images.

Meanwhile, the migration system according to the exemplary embodiment of the present invention may further include an image quality improvement unit 200 for enhancing the accuracy of the migration image obtained by the migration unit 100. The image quality improvement unit 200 applies an absolute value function to the migration images acquired by the convolution of the convolution unit 160 (S700), thereby obtaining distinct interfaces and improved subsurface structure images.

Finally, a scaling unit 300 may perform scaling on subsurface structure images (S800) to finally obtain the scaled migration images.

Thereafter, this will be described in more detail based on the following Equation. In the elastic reverse-time migration, a process of wavefield decomposition needs to be preferentially performed. Generally, a method according to the Helmholtz decomposition has been mainly used, in which the elastic displacement wavefield is represented by the following Equation 1.

$$U = \nabla \phi + \nabla \times \Psi \qquad \text{[Equation 1]}$$

In the above Equation 1, U represents a displacement wavefield vector and $\nabla \phi$ and $\nabla \times \Psi$ represent curl and divergence components, respectively. By using the above Equation 1, the P- and S-wavefields may be represented by the following Equations 2 and 3.

$$U_P = \nabla \cdot U \qquad \text{[Equation 2]}$$

$$U_S = \nabla \times U \qquad \text{[Equation 3]}$$

That is, since the wavefields may be separated by applying a divergence operator or a curl operator to the displacement wavefield, the related art uses the divergence operator to perform the process of separating wavefields. However, the exemplary embodiment of the present invention does not use the divergence or curl operator but uses the stress-displacement relationships as illustrated in the following Equations 4 and 5 to perform the process of separating wavefields (S400 and S500).

$$\tau_{xx} = (\lambda + 2\mu)\frac{\partial u_x}{\partial x} + \lambda \frac{\partial u_z}{\partial z} \qquad \text{[Equation 4]}$$

$$\tau_{zz} = (\lambda + 2\mu)\frac{\partial u_z}{\partial z} + \lambda \frac{\partial u_x}{\partial x} \qquad \text{[Equation 5]}$$

In the above Equations 4 and 5, $\lambda$ and $\mu$ represent the Lame's parameters, $\tau_{xx}$ and $\tau_{zz}$ represent stress terms, $u_x$ and $u_z$ represent displacement vector the x- and z-axes, respectively. Generally, the decomposed P-wavefield may be represented by a sum of partial differentiation for $u_x$ and $u_z$ with respect to each axis. This may be represented by the sum of stress terms like the following Equation 6 by using the stress-displacement relationships like the above Equations 4 and 5. That is, the wavefields are separated by using the following Equation 6 about the stress-displacement relationships in the elastic media.

$$U_P = \nabla \cdot U = \left(\frac{\partial u_x}{\partial x} + \frac{\partial u_z}{\partial z}\right) = \frac{(\tau_{xx} + \tau_{zz})}{2(\lambda + \mu)} \qquad \text{[Equation 6]}$$

FIGS. 3A to 3I show snapshots of the wavefield of displacement in the horizontal, vertical directions and decomposed P-wavefield by using divergence operator according to the related art. FIGS. 4A to 4I show snapshots of the wavefield of displacement in the horizontal, vertical directions and decomposed P-wavefield by using the stress-displacement relationships according to the exemplary embodiment of the present invention. In particular, referring to the 150-th traces of seismogram, respectively, when the P-wavefield decomposition is performed using the divergence operator, the waveform is changing, but when the P-wavefield decomposition is performed using the stress-displacement relationships according to the exemplary embodiment of the present invention, the waveform is not changed.

Figure 5A:
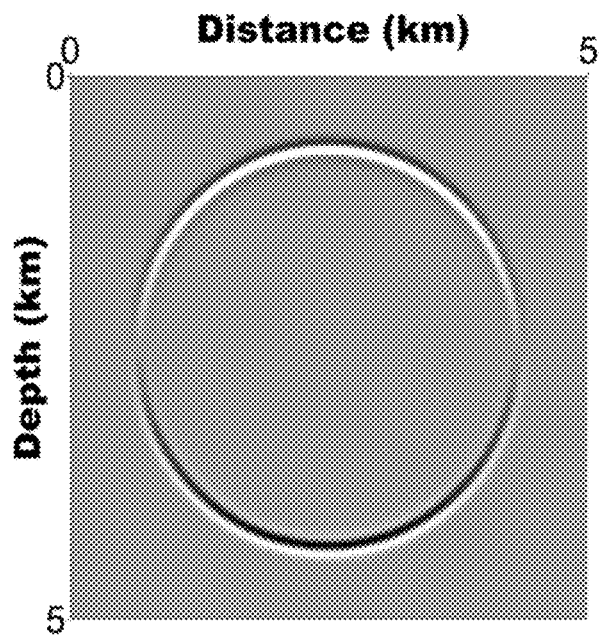
FIG. 5A is a diagram illustrating decomposed P-wavefield by using the divergence operator according to the related art and FIG. 5B is a diagram illustrating decomposed P-wavefield by using the relational expression between the displacement and the stress according to the exemplary embodiment of the present invention.
Figure 5B:
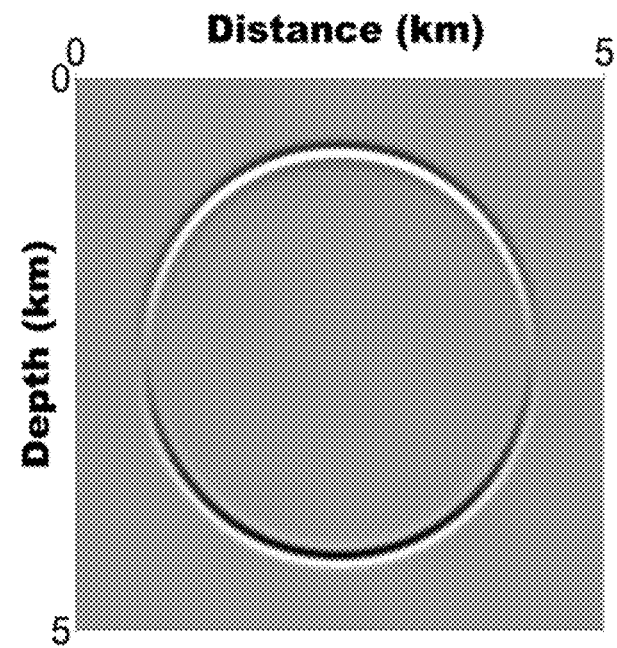

Further, FIG. 5A is a diagram illustrating the decomposed P-wavefield by using divergence operator according to the related art and FIG. 5B is a diagram illustrating the decomposed P-wavefield by using the stress-displacement relationships according to the exemplary embodiment of the present invention. As results of decomposed P-wavefield obtained by using divergence operator according to the related art and the stress-displacement relationships according to the exemplary embodiment of the present invention are similar to each other, it can be confirmed that decomposition of the P-wavefield may be conducted successfully using the stress-displacement relationships instead of the divergence operator according to the related art.

That is, it can be confirmed from FIGS. 3A to 5B that decomposition of the P-wavefield by the virtual source wavefield waveform separation unit 140 and the back-propagated wavefield waveform separation unit 150 according to the exemplary embodiment of the present invention may be conducted using the stress-displacement relationships. In this case the waveform changing by spatial derivatives on displacement components using the divergence operator according to the related art may be minimized.

Meanwhile, to apply the decomposition of the P-wavefield, the elastic reverse-time migration in the time domain may be represented by the following Equation 7.

$$I_k = \int \frac{\partial U(t)}{\partial p_k} d(t) dt \qquad \text{[Equation 7]}$$

In the above Equation 7, k represents a lattice position, U(t) represents the time domain modeled displacement wavefield, $$\frac{\partial U(t)}{\partial p_k}$$

represents the partial-derivative wavefield with respect to the k-th parameter, and d(t) represents seismic data acquired on the scene. The partial-derivative wavefield is represented by the following Equation 8 by the convolution of the Green's function and the virtual source vector.

$$\frac{\partial U(t)}{\partial p_k} = G * S_k \qquad \text{[Equation 8]}$$

In above Equation 8, G is the Green's function, * is a convolution operator, and $S_k$ is a virtual source vector. By applying the above Equation 8 to the above Equation 7, the following Equation 9 may be obtained.

$$\begin{aligned} I_k &= \frac{\partial U(t)}{\partial p_k} \otimes d(t) \qquad \text{[Equation 9]} \\ &= (G * S_k) \otimes d(t) \\ &= (G * S_k) \otimes d(T-t) \\ &= S_k * (G * d(t)) \end{aligned}$$

In the above Equation 9, ⊗ represents a zero-lag cross correlation, T represents the total record length, and t represents the record time. The back-propagated wavefield B(t) is represented by the following Equation 10.

$$B(t) = G * d(T-t) \qquad \text{[Equation 10]}$$

Therefore, the above Equation 9 may be represented by the following Equation 11 using the above Equation 10.

$$\begin{aligned} I_k &= S_k * B(t) \qquad \text{[Equation 11]} \\ &= S_k \otimes B(T-t) \\ &= \int S_k B(T-t) dt \end{aligned}$$

Meanwhile, a method for representing the above Equation 11 using a virtual source vector was suggested in Chung, W., Shin, J., Shin, C. and Shin, S. 2012, Elastic reverse-time migration using the Helmholtz decomposition in the time domain, SEG Expanded abstract, SEG Las Vegas 2012 Annual Meeting. By using the virtual source vector, the reverse-time migration is represented by the following Equation 12.

$$I = \int F^T B(T-t) dt \qquad \text{[Equation 12]}$$

In the above Equation 12, F represents the virtual source vector. By considering an explosion position in all the sources, the migration images may be represented by the following Equation 13 and by applying the decomposition of P-wavefield using the divergence operator, the migration images may be represented by the following Equation 14. nshot represents the exploded frequency of the sound source.

$$I = \frac{\sum_{nshot} \int F^T(t) B(T-t) dt}{\sum_{nshot} \int \mathrm{diag}[F^T(t) F(t)] dt} \qquad \text{[Equation 13]}$$

$$I = \frac{\sum_{nshot} \int [\nabla \cdot F(t)]^T [\nabla \cdot B(t)] dt}{\sum_{nshot} \int \mathrm{diag}\{[\nabla \cdot F(t)]^T [\nabla \cdot F(t)]\} dt} \qquad \text{[Equation 14]}$$

The elastic reverse-time migration according to the related art uses the above Equation 14. On the other hand, since the decomposition of P-wavefield was performed using the above Equation 6 about the stress-displacement relationships, the reverse-time migration using the stress-displacement relationships corresponding to the above Equation 14 is represented like the following Equation 15.

$$I = \frac{\sum_{nshot} \int [\alpha_F(t)]^T [\alpha_B(t)] dt}{\sum_{nshot} \int \mathrm{diag}\{[\alpha_F(t)]^T [\alpha_F(t)]\} dt} \qquad \text{[Equation 15]}$$

In the above Equation 15, $\alpha_F = F_{\tau_{xx}} + F_{\tau_{zz}}$ and is the decomposed P-wavefield vector from the virtual source vector. In this case, $F_{\tau_{xx}} = [S_{x_1} S_{x_2} S_{x_3} \ldots S_{x_n}]$ and $F_{\tau_{zz}} = [S_{z_1} S_{z_2} S_{z_3} \ldots S_{z_n}]$ and $S_x$ and $S_z$ may be represented by the following Equation 16.

$$S_x = S_z = 2v_{p_k}\rho\left(\frac{\partial u_x}{\partial x} + \frac{\partial u_z}{\partial z}\right) = \frac{v_{p_k}^2(\tau_{xx} + \tau_{zz})}{(v_{p_k}^2 + v_{s_k}^2)} \qquad \text{[Equation 16]}$$

$\alpha_B$ is represented by $\alpha_B = B_{\tau_{xx}} + B_{\tau_{zz}}$. In this case, $B_{\tau_{xx}}$ and $B_{\tau_{zz}}$ represent the stress terms of the back-propagated wavefield, respectively.

Further, the exemplary embodiment of the present invention applies the absolute value function to the migration images defined as the above Equation 15 for improvement of migration imaging.

Generally, to analyze the structure information of the subsurface media such as interfaces and strata upon the seismic complex analysis, an envelope function has been mainly used. The seismic data to which the envelope function is applied have the strengthened low frequency component and is represented only by reflection strength, and as a result are very suitable for the analysis of the stratum structure.

The absolute value function has similar characteristics to the envelope signal used for the seismic complex analysis as described above to the migration technique. The exemplary embodiment of the present invention applies the absolute value function because the result obtained by the absolute value function is more visible than enveloped result at the changing point of polarity.

Figure 6A:
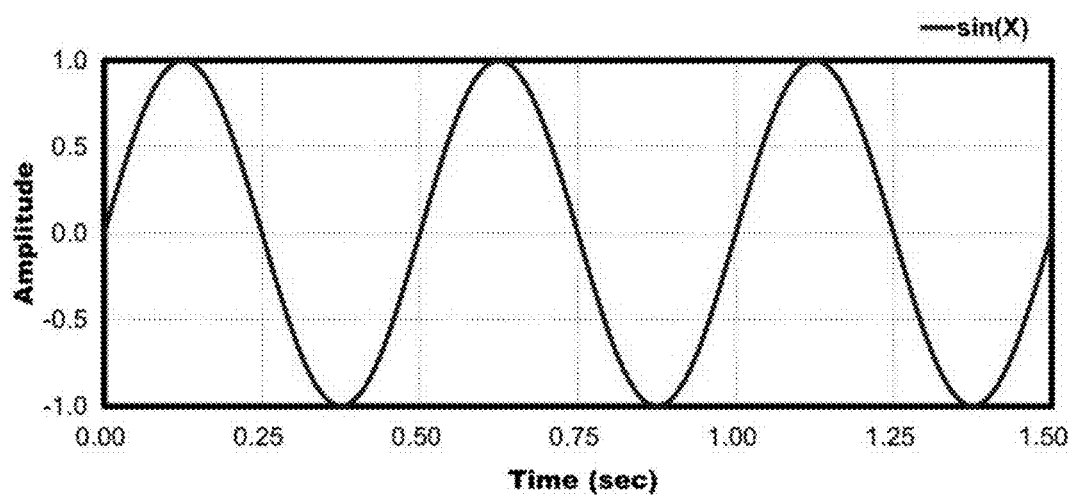
FIG. 6A is a diagram illustrating any sine signal and FIG. 6B is a diagram illustrating a processed signal by absolute value and envelope functions.
Figure 6B:
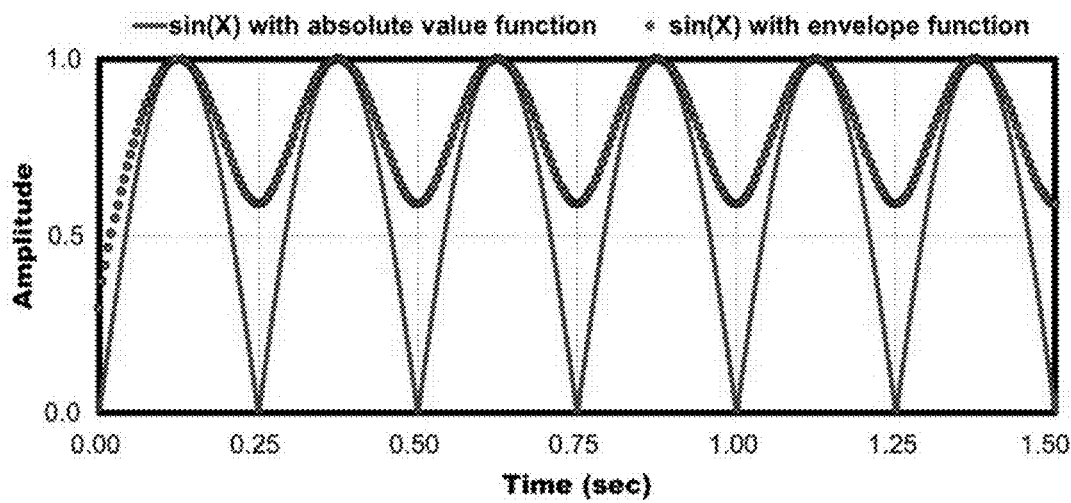

FIG. 6A is a diagram illustrating a raw time signal, sin(x) and FIG. 6B is a diagram illustrating the results obtained by the envelope and the absolute value functions, respectively. As illustrated in FIGS. 6A and 6B, maximum amplitude and a wavelength have similar features to each other, but it can be confirmed that an amplitude change of the signal by the absolute value function shows clearer at the changing point of polarity. For this reason, the exemplary embodiments of the present invention use the absolute value function, thereby obtaining the more improved subsurface structure images that more clearly show interfaces.

Here, the migration images obtained by the absolute value function may be represented by the following Equation 17.

$$I = \frac{\sum_{nshot} \int |\alpha_F(t)|^T |\alpha_B(t)| dt}{\sum_{nshot} \int \text{diag}\{[\alpha_F(t)]^T [\alpha_F(t)]\} dt} \quad \text{[Equation 17]}$$

By the above Equation 17, the migration images to which the absolute value function is applied may be obtained.

Figure 7A:
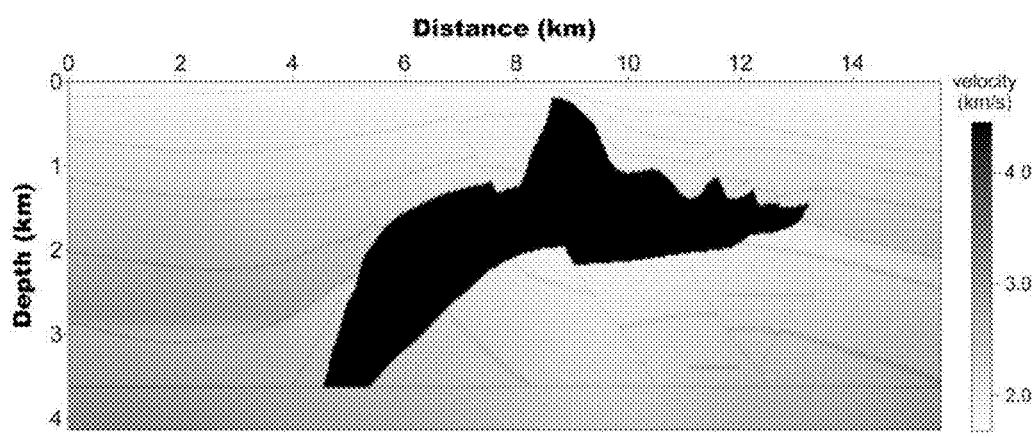
FIG. 7A is a diagram illustrating the true P-wave velocity model for the SEG/EAGE salt dome.
Figure 7B:
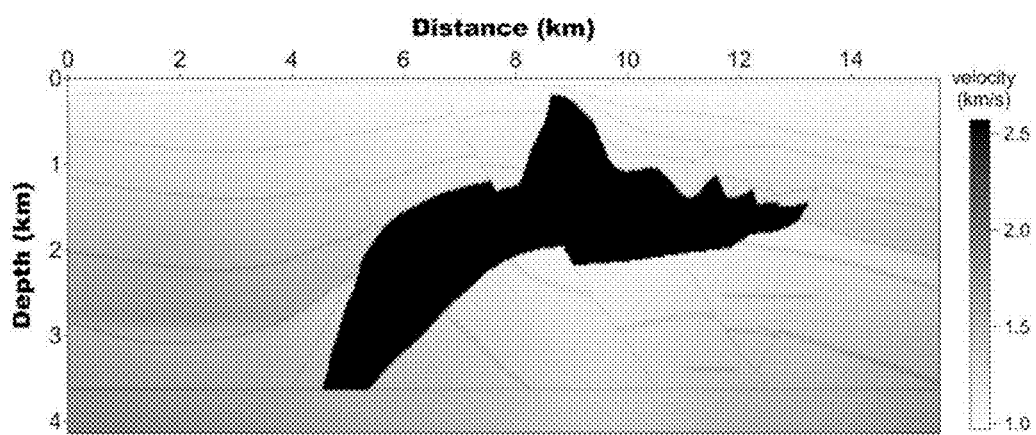
FIG. 7B is a diagram illustrating the true S-wave velocity model for the SEG/EAGE salt dome.
Figure 7C:
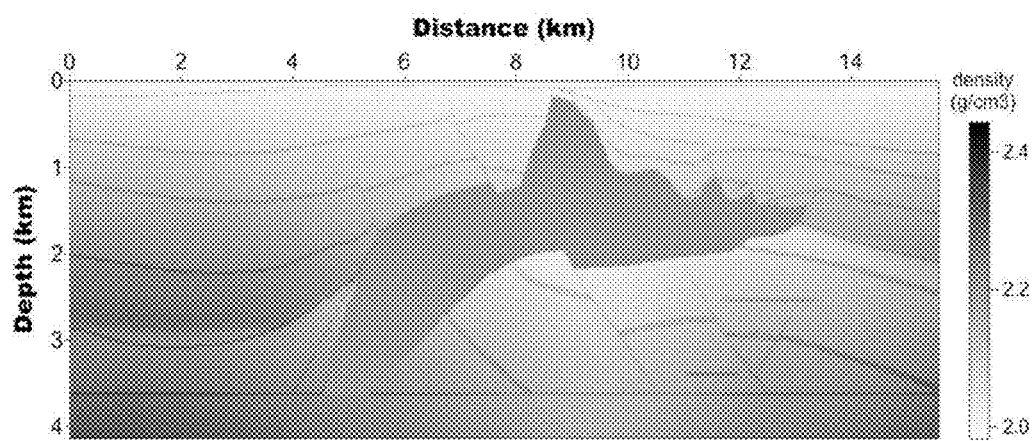
FIG. 7C is a diagram illustrating the true density model of the SEG/EAGE salt dome.
Figure 8A:
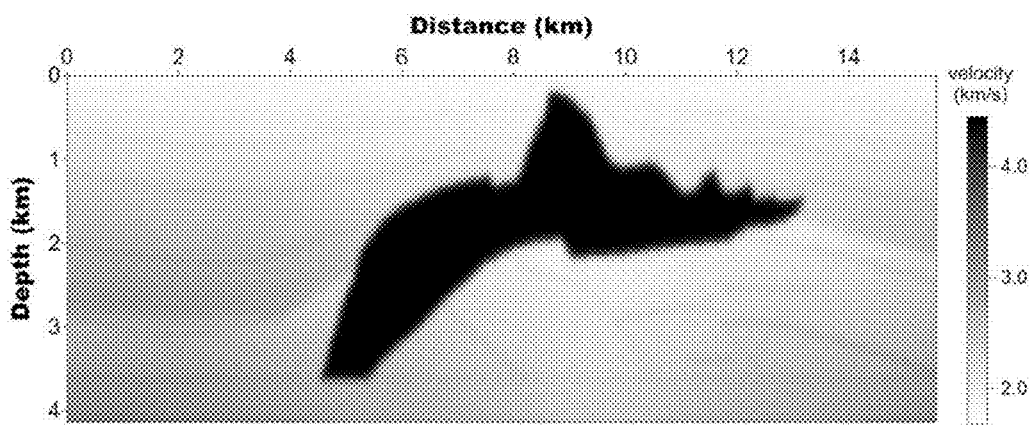
FIG. 8A is a diagram illustrating the input P-wave velocity model for the SEG/EAGE salt dome smoothed to be applied to the exemplary embodiment of the present invention.
Figure 8B:
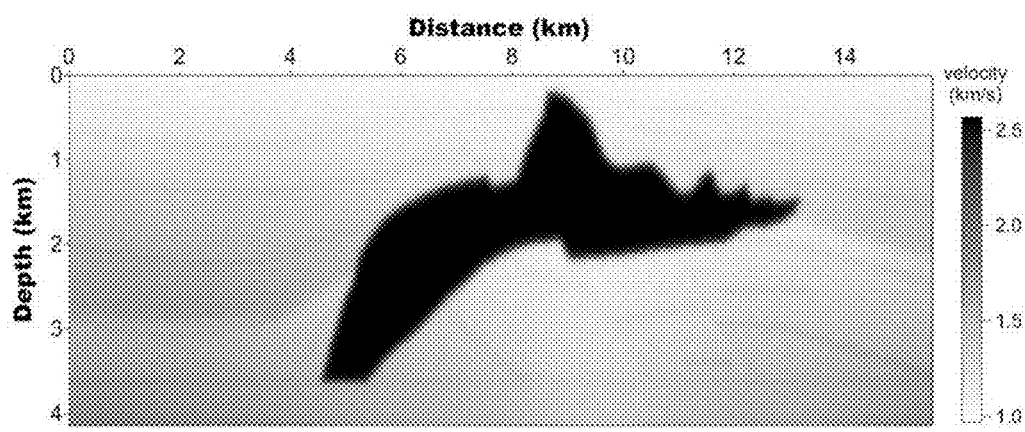
FIG. 8B is a diagram illustrating the input S-wave velocity model for the SEG/EAGE salt dome smoothed to be applied to the exemplary embodiment of the present invention.
Figure 8C:
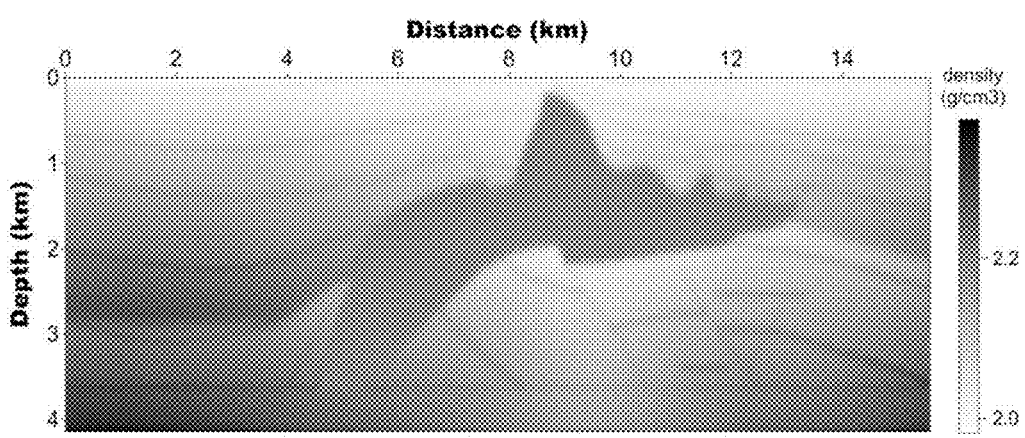
FIG. 8C is a diagram illustrating the input density model of the SEG/EAGE salt dome smoothed to be applied to the exemplary embodiment of the present invention.

To confirm the effect of the exemplary embodiment of the present invention, the migration method according to the exemplary embodiment of the present invention was applied to the SEG/EAGE Salt model. The SEG/EAGE Salt model is a widely used model to verify the related researches and technologies and is sufficient to confirm the effect of the exemplary embodiments of the present invention and thus selected. The SEG/EAGE Salt model used in the exemplary embodiment of the present invention is a P-wave velocity model of FIG. 7A, an S-wave velocity model of FIG. 7B, and a density model of FIG. 7C and as illustrated in FIGS. 8A to 8C, the reverse-time migration according to the exemplary embodiment of the present invention was performed with the velocity models obtained by smoothing the model of FIGS. 7A to 7C.

Figure 9:
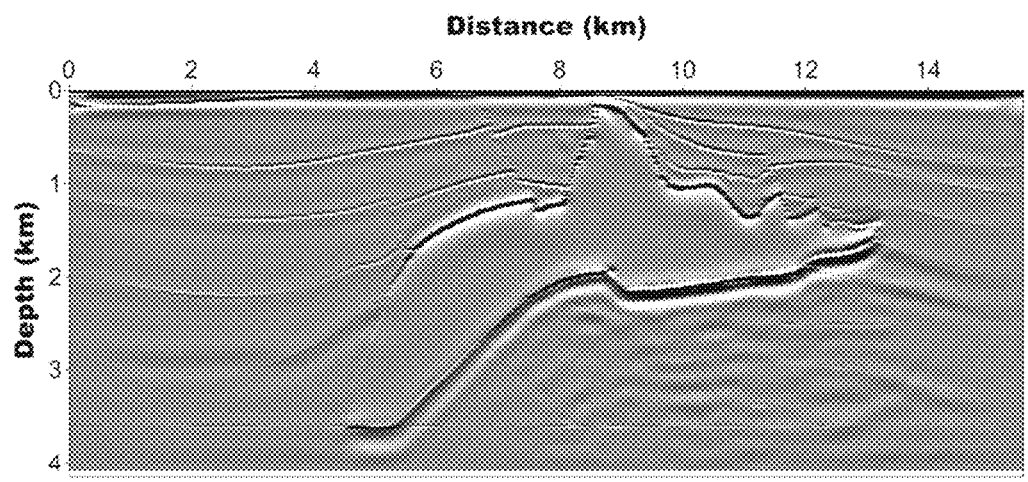
FIG. 9 is a diagram illustrating reverse-time migration imaging using the existing migration method.
Figure 10:
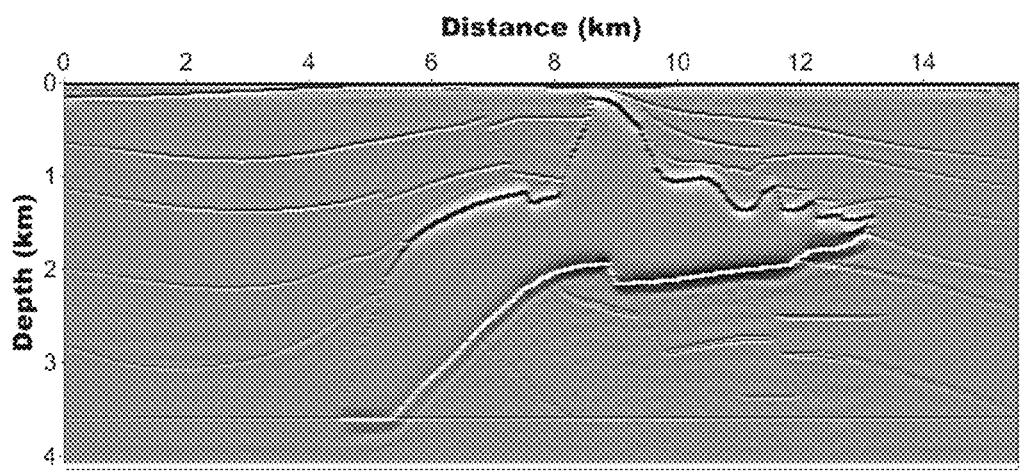
FIG. 10 is a diagram illustrating reverse-time migration imaging using a migration method according to an exemplary embodiment of the present invention.

The migration images obtained by using the reverse-time migration method used in the related art is illustrated in FIG. 9 and the migration images obtained by the reverse-time migration method according to the exemplary embodiment of the present invention is illustrated in FIG. 10. Comparing the two images, the interfaces of images obtained by using the method according to the exemplary embodiment of the present invention are more distinct than those obtained by using the method according to the related art. In particular, the method according to the related art may little show the substructure of the salt dome, but the method according to the exemplary embodiment of the present invention is able to reproduce the accurate images for the substructure of the salt dome. As a result, it can be appreciated that the migration method according to the exemplary embodiment of the present invention may provide the more improved images than the migration method according to the related art.

The exemplary embodiments of the present invention use the stress-displacement relationships for decomposing of the P-wavefield, thereby minimizing the numerical errors that may occur due to the use of the divergence operator for decomposing of the P-wavefield of the related art.

Further, the exemplary embodiments of the present invention use the absolute value function, thereby obtaining the more accurate subsurface structure images that more clearly shows distinct interface.

The present invention is not limited to the above-mentioned exemplary embodiments, and may be variously applied, and may be variously modified without departing from the gist of the present invention claimed in the claims.

What is claimed is:

1. An elastic reverse-time migration system, comprising:
a virtual source calculation unit being input seismic data and a subsurface structure model to calculate a virtual source;
a virtual source wavefield calculation unit calculating a virtual source wavefield from the calculated virtual source;
a back-propagated wavefield calculation unit loading the seismic data to perform back propagation processing and calculate a back-propagated wavefield;
a virtual source wavefield waveform separation unit using stress-displacement relationships to decompose P-wavefield from the virtual source wavefield;
a back-propagated wavefield waveform separation unit using the stress-displacement relationships to decompose P-wavefield from the back-propagated wavefield; and
a convolution unit convoluting the two wavefields decomposed by the virtual source wavefield waveform separation unit and the back-propagated wavefield waveform separation unit, respectively,
wherein the stress-displacement relationships satisfy the following Equation $$\tau_{xx} = (\lambda + 2\mu)\frac{\partial u_x}{\partial x} + \lambda\frac{\partial u_z}{\partial z}$$

$$\tau_{zz} = (\lambda + 2\mu)\frac{\partial u_z}{\partial z} + \lambda\frac{\partial u_x}{\partial x}$$

(in the above Equation, $\lambda$ and $\mu$ represent the Lame's parameters, $\tau_{xx}$ and $\tau_{zz}$ represent stress tensors, $u_x$ and $u_z$ represent displacements, respectively, for the x- and z-axes).

2. The elastic reverse-time migration system of claim 1, further comprising:
an image quality improvement unit applying an absolute value function to migration images obtained by the convolution of the convolution unit.

3. An elastic reverse-time migration method, comprising:
a) loading seismic data and subsurface structure model data;
b) calculating a virtual source on the basis of the input data and calculating a virtual source wavefield;
c) performing back propagation processing on the seismic data to calculate a back-propagated P-wavefield;
d) decomposing a P-wavefield from the virtual source wavefield using stress-displacement relationships;
e) decomposing a wavefield form the back-propagated wavefield using the stress-displacement relationships; and
f) convoluting the two wavefields decomposed in the step c) and the step e), respectively,
wherein the stress-displacement relationships satisfy the following Equation $$\tau_{xx} = (\lambda + 2\mu)\frac{\partial u_x}{\partial x} + \lambda\frac{\partial u_z}{\partial z}$$

$$\tau_{zz} = (\lambda + 2\mu)\frac{\partial u_z}{\partial z} + \lambda\frac{\partial u_x}{\partial x}$$

(in the above Equation, $\lambda$ and $\mu$ represent the Lame's parameters, $\tau_{xx}$ and $\tau_{zz}$ represent stress tensors, $u_x$ and $u_z$ represent displacements respectively, for the x- and z-axes).

4. The elastic reverse-time migration method of claim 3, further comprising:
g) applying an absolute value function to migration images obtained by the convolution in the step f).

* * * * *